(12) United States Patent
Mudalige et al.

(10) Patent No.: US 9,971,352 B1
(45) Date of Patent: May 15, 2018

(54) AUTOMATED CO-PILOT CONTROL FOR AUTONOMOUS VEHICLES

(71) Applicant: GM GLOBAL TECHNOLOGY OPERATIONS LLC, Detroit, MI (US)

(72) Inventors: Upali P. Mudalige, Oakland Township, MI (US); Padma Sundaram, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/353,852

(22) Filed: Nov. 17, 2016

(51) Int. Cl.
G05D 1/00 (2006.01)
G05D 1/02 (2006.01)
G07C 5/08 (2006.01)

(52) U.S. Cl.
CPC ......... G05D 1/0253 (2013.01); G05D 1/0248 (2013.01); G07C 5/0808 (2013.01)

(58) Field of Classification Search
USPC .......................................................... 701/28
See application file for complete search history.

(56) References Cited

U.S. PATENT DOCUMENTS

| | | | | |
|---|---|---|---|---|
| 6,718,259 B1* | 4/2004 | Khosla | ................... | G01C 21/26 340/435 |
| 7,639,841 B2* | 12/2009 | Zhu | ..................... | G06K 9/00335 340/435 |
| 8,812,226 B2* | 8/2014 | Zeng | ..................... | G01S 13/723 382/103 |
| 9,555,803 B2* | 1/2017 | Pawlicki | ............ | B60K 31/0008 |
| 2010/0191391 A1* | 7/2010 | Zeng | ................ | G01S 13/723 701/1 |
| 2013/0179382 A1* | 7/2013 | Fritsch | ................... | G06N 7/005 706/46 |
| 2016/0363930 A1* | 12/2016 | Kwak | .................. | G05D 1/0231 |

* cited by examiner

Primary Examiner — Tyler Paige

(57) ABSTRACT

A control system for a vehicle includes at least one controller. The controller is programmed to receive first sensor readings from a first group of sensors and provide a first vehicle pose based on the first sensor readings. The first vehicle pose includes a first location and a first orientation of the vehicle. The controller is also programmed to receive second sensor readings from a second group of sensors and provide a second vehicle pose based on the second sensor readings. The second vehicle pose includes a second location and a second orientation of the vehicle. The controller is further programmed to, in response to the first vehicle pose being outside a predetermined range of the second vehicle pose, generate a diagnostic signal.

16 Claims, 5 Drawing Sheets

AUTOMATED CO-PILOT CONTROL FOR AUTONOMOUS VEHICLES

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes a plurality of sensors configured to detect external features in the vicinity of the automotive vehicle. The vehicle additionally includes an actuator configured to control vehicle steering, acceleration, braking, or shifting. The vehicle further includes at least one controller in electronic communication with respective sensors of the plurality of sensors and the actuator. The controller is programmed with an automated driving system control algorithm and configured to automatically control the actuator based on the automated driving system control algorithm. The automated driving control system algorithm includes a first localization algorithm, a second localization algorithm, and a localization arbitration algorithm. The first localization algorithm is configured to receive first sensor readings from a first group of respective sensors of the plurality of sensors and provide a first vehicle pose based on the first sensor readings. The first vehicle pose includes a first location and a first orientation of the vehicle. The second localization algorithm is configured to receive second sensor readings from a second group of respective sensors of the plurality of sensors and provide a second vehicle pose based on the second sensor readings. The second vehicle pose includes a second location and a second orientation of the vehicle. The localization arbitration algorithm is configured to, in response to the first vehicle pose being outside of a predetermined range of the second vehicle pose, generate a diagnostic signal.

In an exemplary embodiment, the at least one controller is further programmed to, in response to the first vehicle pose being within the predetermined range of the second vehicle pose, determine a primary vehicle pose among the first vehicle pose and the second vehicle pose, and control the actuator according to the automated driving system control algorithm based on the primary pose.

In an exemplary embodiment, the diagnostic signal includes a parameter representative of a difference between the first vehicle pose and the second vehicle pose.

In an exemplary embodiment, the controller is further programmed to, in response to the diagnostic signal, control the actuator according to a fall back command.

In an exemplary embodiment, the at least one controller includes a first controller and a second controller. The first controller is programmed with the first localization algorithm and the second controller is programmed with the second localization algorithm.

In an exemplary embodiment, the first localization algorithm includes a visual odometry 3D pose estimation and the second localization algorithm includes a LiDAR odometry 3D pose estimation.

A method of controlling a vehicle according to the present disclosure includes providing the vehicle with a plurality of sensors configured to detect external features in the vicinity of the vehicle. The method also includes providing the vehicle with an actuator configured to control vehicle steering, throttle, braking, or shifting. The method additionally includes providing the vehicle with at least one controller in electronic communication with respective sensors of the plurality of sensors and the actuator. The controller is programmed with an automated driving control system algorithm. The method further includes receiving, via the at least one controller, first sensor readings from a first group of respective sensors of the plurality of sensors. The method includes determining, via the at least one controller, a first vehicle pose based on the first sensor readings. The first vehicle pose includes a first location and a first orientation of the vehicle. The method additionally includes receiving, via the at least one controller, second sensor readings from a second group of respective sensors of the plurality of sensors. The method further includes determining, via the at least one controller, a second vehicle pose based on the second sensor readings. The second vehicle pose includes a second location and a second orientation of the vehicle. The method further includes, in response to the first vehicle pose being outside of a predetermined range of the second vehicle pose, automatically generating a diagnostic signal.

In an exemplary embodiment, the method additionally includes, in response to the first vehicle pose being within the predetermined range of the second vehicle pose, determining, via the at least one controller, a primary vehicle pose among the first vehicle pose and the second vehicle pose, and controlling, via the at least one controller, the actuator according to the automated driving system control algorithm based on the primary pose.

In an exemplary embodiment, the diagnostic signal includes a parameter representative of a difference between the first vehicle pose and the second vehicle pose.

In an exemplary embodiment, the method additionally includes, in response to the diagnostic signal, automatically controlling the actuator according to a fall back command.

In an exemplary embodiment, providing the vehicle with at least one controller includes providing the vehicle with a first controller and a second controller. In such embodiments, receiving first sensor readings is performed via the first controller, determining a first vehicle pose is performed via the first controller, receiving second sensor readings is performed via the second controller, and determining a second vehicle pose is performed via the second controller.

In an exemplary embodiment determining a first vehicle pose includes performing a visual odometry 3D pose estimation, and determining a second vehicle pose includes performing a LiDAR odometry 3D pose estimation.

A control system for a vehicle according to the present disclosure includes at least one controller. The controller is programmed to receive first sensor readings from a first group of sensors and provide a first vehicle pose based on the first sensor readings. The first vehicle pose includes a first location and a first orientation of the vehicle. The controller is also programmed to receive second sensor readings from a second group of sensors and provide a second vehicle pose based on the second sensor readings. The second vehicle pose includes a second location and a second orientation of the vehicle. The controller is further programmed to, in response to the first vehicle pose being outside a predetermined range of the second vehicle pose, generate a diagnostic signal.

In an exemplary embodiment, the controller is further programmed to, in response to the first vehicle pose being within the predetermined range of the second vehicle pose, determine a primary vehicle pose among the first vehicle pose and the second vehicle pose, and control the actuator according to the automated driving system control algorithm based on the primary pose.

In an exemplary embodiment, the diagnostic signal includes a parameter representative of a difference between the first vehicle pose and the second vehicle pose.

In an exemplary embodiment, the at least one controller is further programmed to, in response to the diagnostic signal, control at least one actuator according to a fall back command.

In an exemplary embodiment, the at least one controller is further programmed to, in response to no diagnostic signal being generated, determine a primary vehicle pose among the first vehicle pose and the second vehicle pose, and control at least one actuator according to the automated driving system control algorithm based on the primary pose.

Embodiments according to the present disclosure provide a number of advantages. For example, embodiments according to the present disclosure may enable independent validation of autonomous vehicle sensor readings to aid in diagnosis of software or hardware conditions in the sensors and controllers. Embodiments according to the present disclosure may thus be more robust, increasing customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
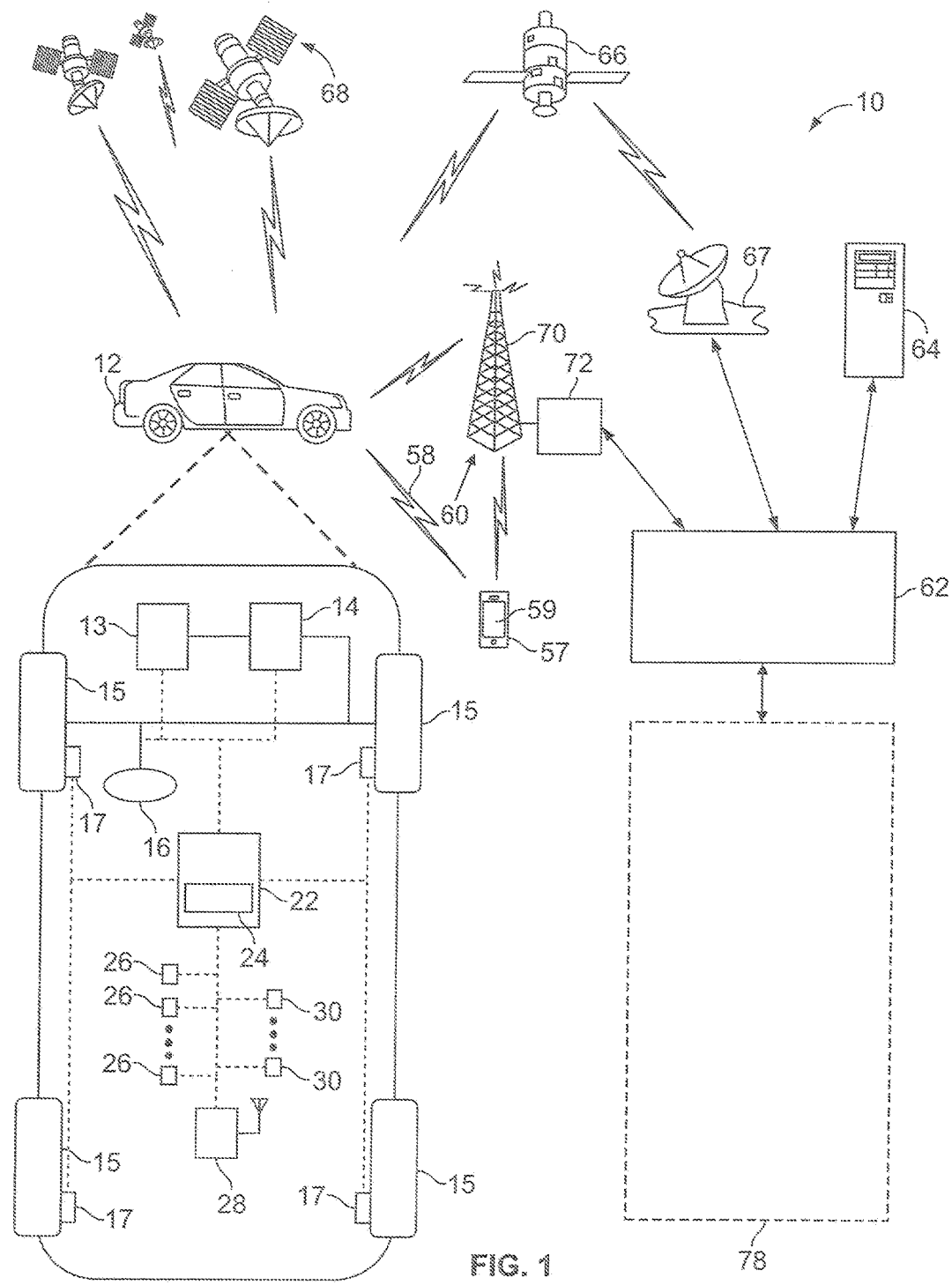
FIG. 1 is a schematic diagram of a communication system including an autonomously controlled vehicle, according to an embodiment.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LiDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

Figure 2:
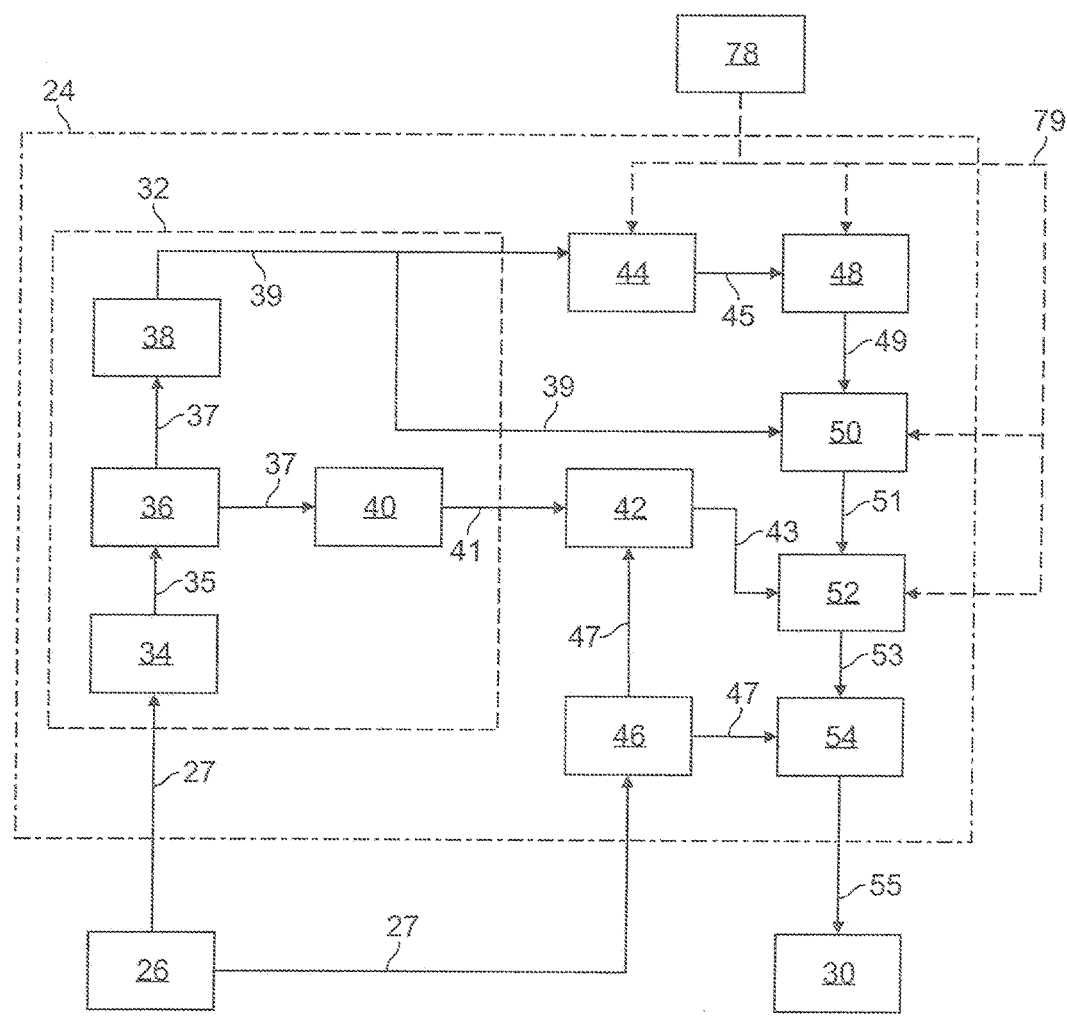
FIG. 2 is a schematic block diagram of an automated driving system (ADS) for a vehicle, according to an embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LiDAR to LiDAR calibration, camera to LiDAR calibration, LiDAR to chassis calibration, and LiDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LiDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LiDAR segmentation, LiDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the pose, e.g. position and orientation, of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of construction zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses Simultaneous Localization and Mapping ("SLAM") techniques to develop maps of the surrounding environment. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map may employ Kalman filters, various statistical correlation methods such as the Pearson product-moment correlation, and/or particle filters.

In some embodiments, once a map is built, vehicle localization is achieved in real time via a particle filter. Particle filters, unlike Bayes or Kalman filters, accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

Particle filter processing is expressed as:

$$P(H_t|H_{t-1},A_t,D_t) \qquad \text{Equation 1}$$

where $H_t$ is the current hypothesis, which is the object position. $H_{t-1}$ is the previous object position, $A_t$ is the action, which is typically a motor command, and $D_t$ is the observable data.

In some embodiments, the localization and mapping module 40 maintains an estimate of the vehicle's global position by incorporating data from multiple sources as discussed above in an Extended Kalman Filter (EKF) framework. Kalman filters are linear filters based on Recursive Bayesian Filters. Recursive Bayesian Filters, also referred to as Recursive Bayesian Estimation, essentially substitute the posterior of an estimation into the prior position to calculate a new posterior on a new estimation iteration. This effectively yields:

$$P(H_t|H_{t-1}, D_t) \quad \text{Equation 2}$$

where the probability of a hypothesis $H_t$ is estimated by the hypothesis at the previous iteration $H_{t-1}$ and the data $D_t$ at current time t.

A Kalman filter adds an action variable $A_t$, where t is a time iteration, yielding:

$$P(H_t|H_{t-1}, A_t, D_t) \quad \text{Equation 3}$$

where the probability of a hypothesis $H_t$ is based on the previous hypothesis $H_{t-1}$, an action $A_t$, and data $D_t$ at current time t.

A Kalman filter estimates a current position, which is a joint probability distribution, and based on an action command predicts a new position which is also a joint probability distribution, called a state prediction. Sensor data is acquired and a separated joint probability distribution is calculated, called a sensor prediction.

State prediction is expressed as:

$$X_t' = AX_{t-1} + B\mu + \varepsilon_t \quad \text{Equation 4}$$

where $X_t$ is a new state based on the previous state $AX_{t-1}$, $B\mu$ and $\xi_t$. Constants A and B are defined by the physics of interest, $\mu$ may be a robotic motor command, and $\xi_t$ is a Gaussian state error prediction.

Sensor prediction is expressed as:

$$Z_t' = CX_t + \varepsilon_z \quad \text{Equation 5}$$

where $Z_t'$ is the new sensor estimate, C is a function and $\xi_z$ is a Gaussian sensor error prediction.

A new predicted state estimate is expressed as:

$$X_{EST} = X_t' + K(Z_t - Z_t') \quad \text{Equation 6}$$

where the product $K(Z_t - Z_t')$ is referred to as the Kalman gain factor. If the difference between the sensor prediction $Z_t'$ and the actual sensor data $Z_t$ (that is, $Z_t - Z_t'$) is reasonably close to zero, then $X_t'$ is considered to be the new state estimate. If $Z_t - Z_t'$ is reasonably larger than zero, the $K(Z_t - Z_t')$ factor is added to yield a new state estimate.

As vehicle movement information is received, the EKF updates the vehicle position estimate while also expanding the estimate covariance. Once the sensor covariance is integrated into the EKF, the localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Bayes' Theorem, also referred to as a Bayesian filter, is a form of conditional probability. Bayes' Theorem, shown below in Equation 7, sets forth the proposition that the probability of a hypothesis H, given data D, is equal to the probability of a hypothesis H times the likelihood of the data D given the hypothesis H, divided by the probability of the data P(D).

$$P(H|D) = \frac{P(H)\ P(D|H)}{P(D)} \quad \text{Equation 7}$$

P(H/D) is referred to as the posterior and P(H) is referred to as the prior. Bayes' Theorem measures a probabilistic degree of belief in a proposition before (the prior) and after (the posterior) accounting for evidence embodied in the data, D. Bayes' Theorem may be used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
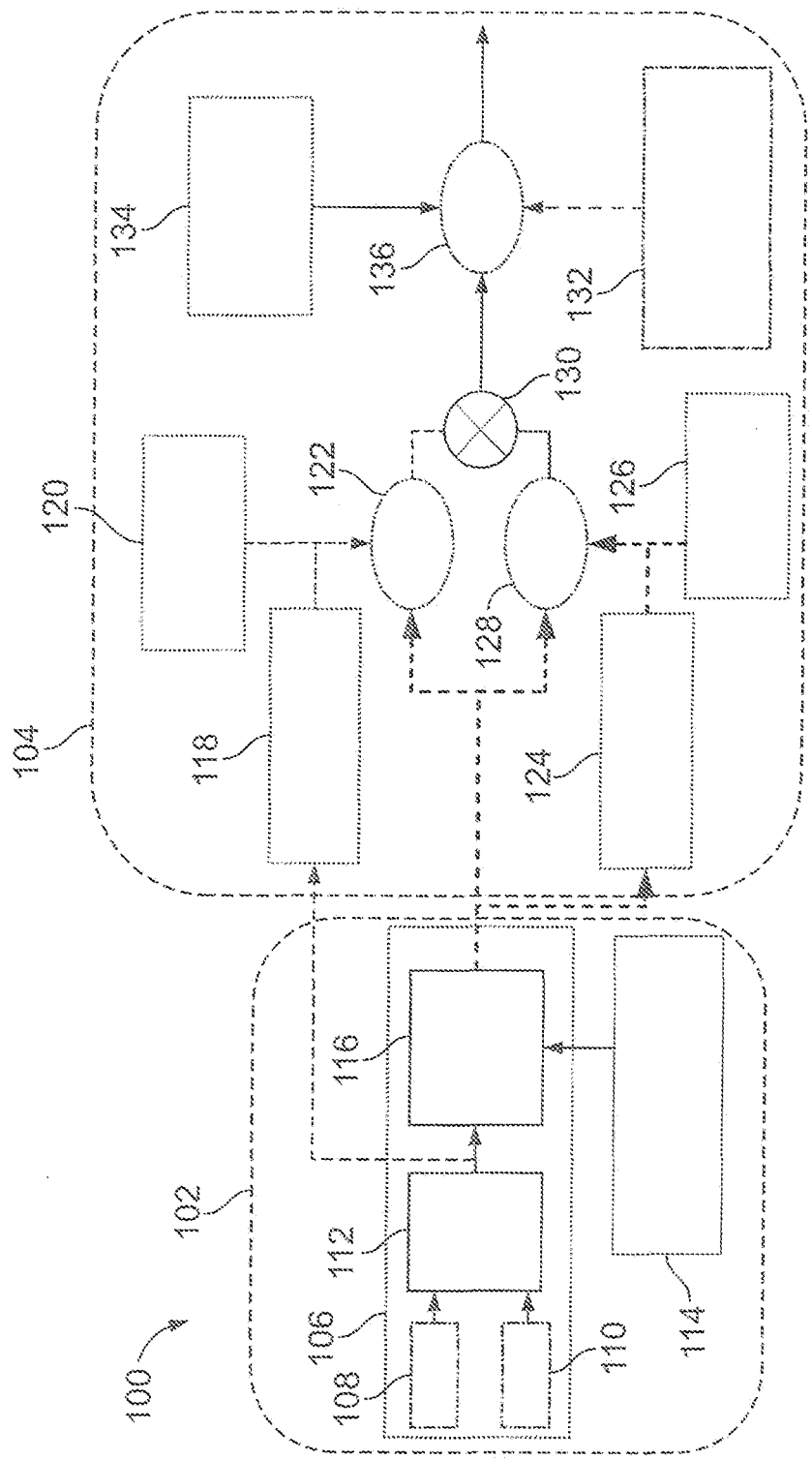
FIG. 3 is a schematic block diagram of a localization system according to an embodiment of the present disclosure.

Referring now to FIG. 3, an exemplary embodiment of a localization and mapping module 100 is illustrated in schematic form. The localization and mapping module 100 may, in an exemplary embodiment, be implemented in an automated driving system in a similar fashion as the module 40 illustrated in FIG. 2.

The localization and mapping module 100 includes an initial position estimation module 102 and a secondary position estimation module 104.

The initial position estimation module 102 includes a primary positioning module 106. The positioning module 106 receives satellite navigation data 108 from a satellite navigation system, e.g. GPS, GLONASS, other global navigation satellite system, or combination thereof. The positioning module 106 also receives inertial data 110 from an inertial measurement unit (IMU). The IMU is an electronic device that measures and reports a body's specific force, angular rate, and sometimes the magnetic field surrounding the body, using a combination of accelerometers and gyroscopes, sometimes also magnetometers. The satellite navigation data 108 and inertial data 110 are combined by a satellite navigation and dead reckoning algorithm 112. Thus, the IMU allows the satellite navigation receiver to work when satellite signals are unavailable, such as in tunnels, inside buildings, or when electronic interference is present.

Correction factors are also received to increase location accuracy, as illustrated at block 114. The correction factors may, for example, include single- or multi-frequency Real Time Kinematic (RTK) or Differential Global Positioning System (DGPS) corrections. DGPS uses a network of fixed, ground-based reference stations to broadcast the difference between the positions indicated by the positioning satellite systems and the known fixed positions. These stations broadcast the difference between measured satellite pseudo-ranges and actual (internally computed) pseudo-ranges, and receiver stations may correct their pseudo-ranges by the same amount. The digital correction signal is typically broadcast locally over ground-based transmitters of shorter range. RTK uses measurements of the phase of the signal's carrier wave, rather than the information content of the signal, and relies on a single reference station or interpolated virtual station to provide real-time corrections. The correction factors 114 are combined with the satellite and dead reckoning position from algorithm 112 by a precision GNSS position estimation algorithm 112.

The secondary position estimation module 104 receives signals from the primary position estimation module 102 and adds further precision via a first localization algorithm and a second localization algorithm.

In the first localization algorithm, a LiDAR odometry module 118 receives the satellite and dead reckoning position from block 112. The LiDAR odometry module 118 utilizes sensor readings from a LiDAR array to estimate a distance travelled by the vehicle during a given time period, and refines the satellite and dead reckoning position from block 112 based on the estimated distance travelled. This will be discussed in further detail below with respect to FIG. 4B. The LiDAR odometry output, along with odometry measurements from a high-resolution wheel encoder algorithm 120 and the estimated position from the precision GNSS position estimation algorithm 116, are filtered using a first EKF 122 to obtain a first vehicle pose, as generally discussed above.

The second localization algorithm is performed in parallel to the first localization algorithm. In the second localization algorithm, a stereo camera odometry module 124 receives the estimated position from the precision GNSS position estimation algorithm 116. The stereo camera odometry module 124 utilizes images obtained by a stereo camera array to estimate a distance travelled by the vehicle during a given time period, and refines the estimated position from the precision GNSS position estimation algorithm 116 based on the estimated distance travelled. This will be discussed in further detail below with respect to FIG. 4C. The stereo camera odometry output, along with odometry measurements from a high-resolution wheel encoder algorithm 120 and the estimated position from the precision GNSS position estimation algorithm 116, are filtered using a second EKF 128 to obtain a second vehicle pose, as generally discussed above.

A selection algorithm 130 receives the first vehicle pose from the first EKF 122 and the second vehicle pose from the second EKF 128 and selects a primary vehicle pose from between the first vehicle pose and the second vehicle pose. As an example, the selection algorithm may identify the primary vehicle pose based on the lesser error covariance matrix among the first vehicle pose and the second vehicle pose, as will be discussed in further detail below with respect to FIG. 3A.

In addition, the selection algorithm 130 calculates a difference between the first vehicle pose and the second vehicle pose. If the difference exceeds a predetermined threshold, the selection algorithm generates a diagnostic signal indicative of the mismatch in the first vehicle pose and the second vehicle pose. A mismatch may be suggestive of a diagnostic condition being present in at least one sensor or controller associated with the automated driving system. The diagnostic signal intensity may, for example, represent the level of disagreement of between the first pose and the second pose. In response to the diagnostic signal, appropriate diagnostic action may be taken. In an exemplary embodiment, in response to the diagnostic signal, the vehicle may autonomously execute an alternative maneuver. The alternative maneuver may include, for example, a fallback command to safely stop the vehicle. Such maneuvers may be referred to as minimal risk condition maneuvers.

The primary pose from the selection algorithm 130, along with optional precision improvements such as V2X communication illustrated at block 132 and positioning using 3D or 2D semantic map database features illustrated at block 134, are filtered using a third EKF 136 to obtain a final vehicle pose, as generally discussed above. The final vehicle pose may then be used by the automated driving system for autonomous control of the vehicle.

Figure 4A:
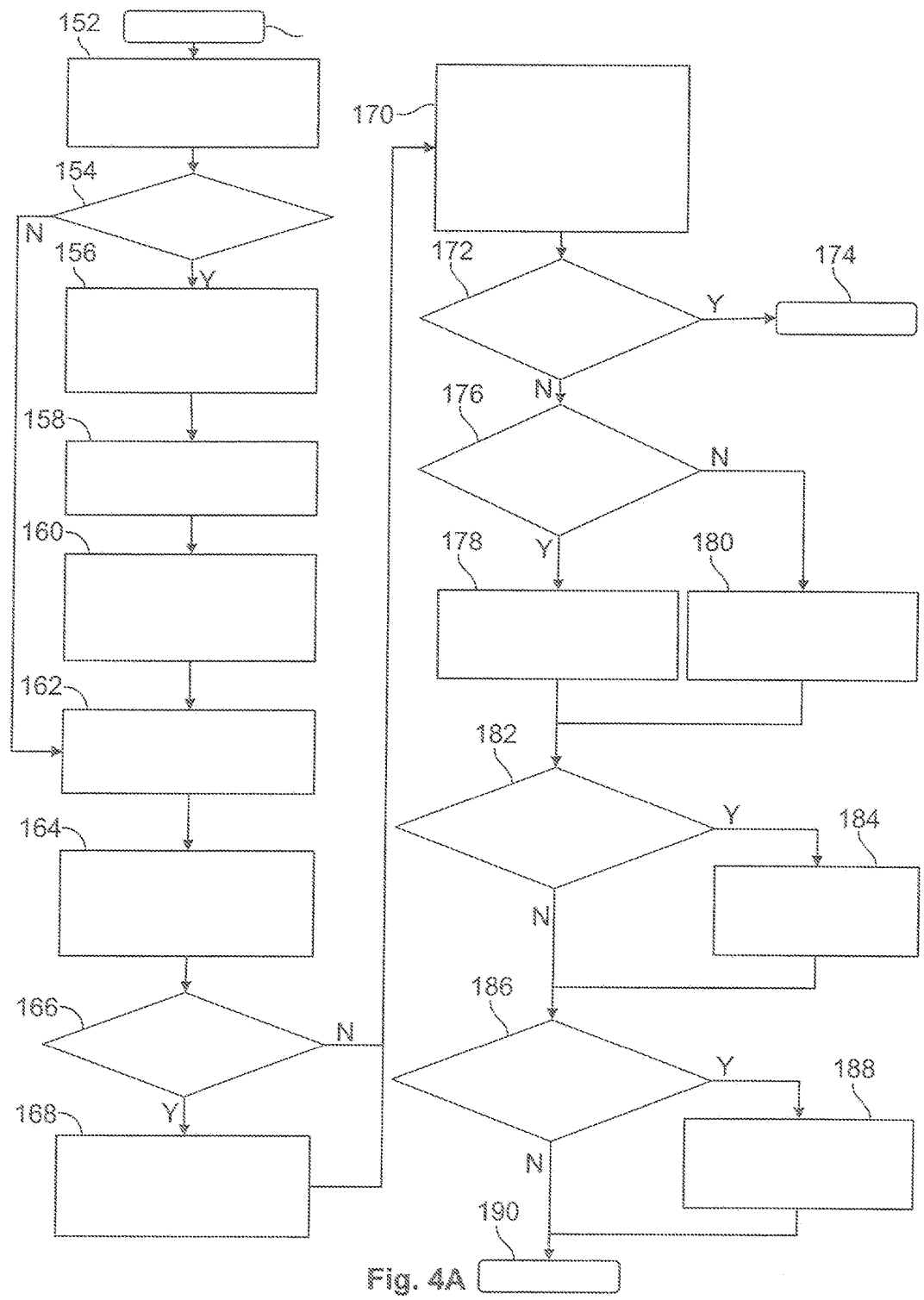
FIGS. 4A-4C are a flowchart representation of a method for controlling a vehicle according to the present disclosure.
Figure 4B:
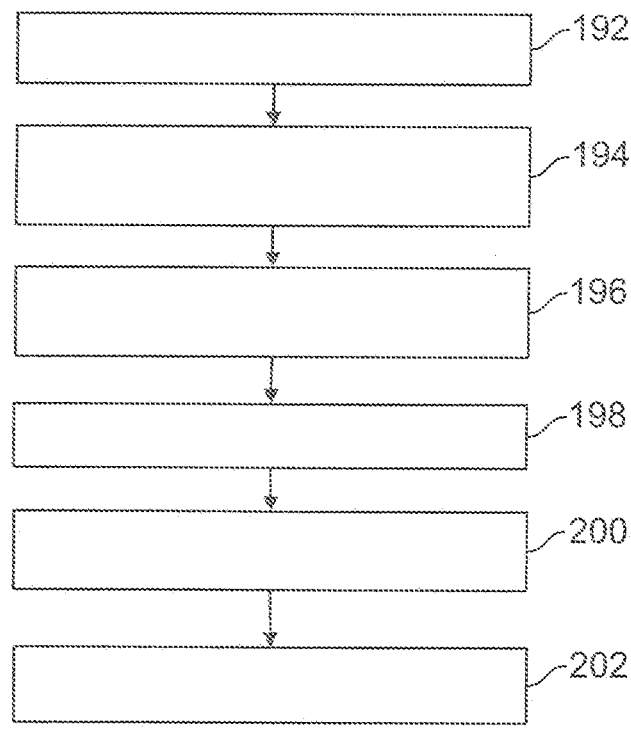
Figure 4C:
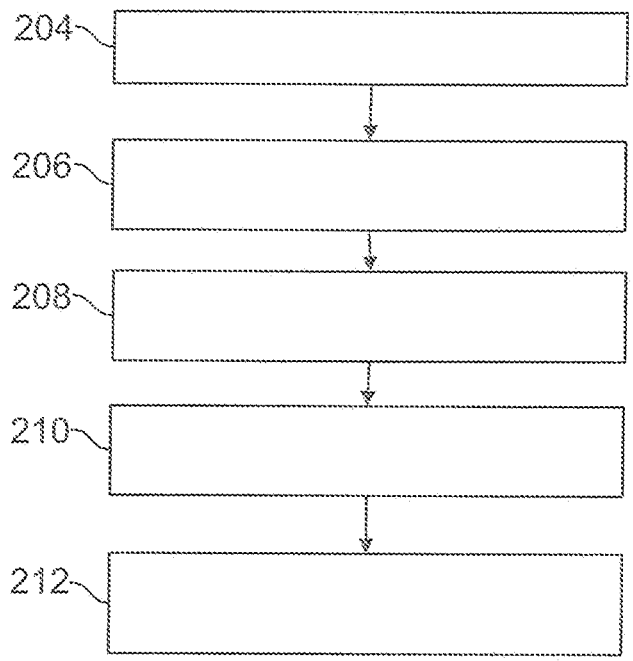

Referring now to FIGS. 4A-4C, a method of determining vehicle pose according to the present disclosure is illustrated in flowchart form. The algorithm begins at block 150.

Pseudo range/carrier GNSS signals are received from a satellite navigation receiver, as illustrated at block 152. A determination is then made of whether corrections are available, as illustrated at operation 154. Such corrections include RTK or DGPS, as discussed above. If the determination of operation 154 is positive, then GNSS corrections are received from satellite, cloud, ad hoc network, or local base stations, as illustrated at block 156. The observations from the base set are downloaded and decompressed, as illustrated at block 158. The observations from the vehicle satellite navigation receiver are aligned with the base station observations to form double differences, as illustrated at block 160. The vehicle's position is then determined using a recursive least-squares method, as illustrated at block 162.

If the determination of operation 154 is negative, then control proceeds directly to block 162 and the vehicle's position is determined using a recursive least-squares method.

The vehicle's current position is extrapolated using sensor readings from the inertial measurement unit and vehicle speed as illustrated at block 164, e.g. using WGS-84 coordinates.

A determination is then made of whether wheel speed data is available, as illustrated at operation 166. If the determination is positive, the current vehicle position is fused with wheel speed sensor data, as illustrated at block 168. Control then proceeds to block 170. If the determination of operation 166 is negative, control proceeds directly to block 170.

A first vehicle pose C is obtained from a first localization algorithm and a second vehicle pose D is obtained from a second localization algorithm, as illustrated at block 170. These algorithms will be discussed in more detail below with respect to FIGS. 4B and 4C, respectively.

A determination is made of whether the magnitude of difference between the first vehicle pose C and the second vehicle pose D exceeds a predetermined threshold, as illustrated at operation 172. If the determination of operation 172 is positive, then a diagnostic signal is generated, as illustrated at block 174. The diagnostic signal intensity may, for example, represent the level of disagreement of between the first pose and the second pose. In response to the diagnostic signal, appropriate diagnostic action may be taken, as discussed above.

If the determination of operation 172 is negative, i.e. the magnitude of difference between the first vehicle pose C and the second vehicle pose D is less than the predetermined threshold, then a determination is made of whether an error covariance matrix for the first vehicle pose C is less than an error covariance matrix for the second vehicle pose D, as illustrated at operation 176.

If the determination is positive, then the first vehicle pose C is selected as the primary pose, as illustrated at block 178. If the determination is negative, then the second vehicle pose D is selected as the primary pose, as illustrated at block 180. In both cases, control then proceeds to operation 182.

A determination is made of whether 3D semantic map features are available, as illustrated at operation 182. If the determination is positive, then the primary vehicle pose is refined using the 3D semantic features, as illustrated at block 184. Control then proceeds to operation 186. If the determination is negative, control proceeds directly to operation 186.

A determination is made of whether WiFi ranging or V2X information is available, as illustrated at operation 186. If the determination is positive, then the vehicle pose is refined using WiFi ranging or V2X information, as illustrated at block 188. The algorithm then ends at block 190. If the determination is negative, the algorithm ends at block 190.

Turning to FIG. 4B, a first localization algorithm is illustrated in flowchart form. LiDAR scan data is received, as illustrated at block 192. Sweep-to-sweep point cloud refinement and map registration is then performed on the LiDAR scan data, as illustrated at block 194. Features are then extracted from the point cloud data, as illustrated at block 196. Motion and measurement updates are performed on the extracted features, as illustrated at block 198. Features extracted are then matched against a LiDAR map database, as illustrated at block 200. A most likely 3D pose is then estimated, as illustrated at block 202.

Turning to FIG. 4C, a second localization algorithm is illustrated in flowchart form. Stereo image data is received, as illustrated at block 204. Frame-by-frame feature detection is performed to find 3D cues, as illustrated at block 206. The detected features are then matched or tracked against a visual feature database, as illustrated at block 208. Motion and pose estimation are then performed, as illustrated at block 210, which may include 3D-to-3D estimation or 3D-to-2D estimation. Local optimization, such as bundle adjustment, is then performed on the pose, as illustrated at block 212.

While the exemplary embodiments above are discussed in conjunction with an autonomous vehicle, one skilled in the art will appreciate that localization and mapping systems according to the present disclosure may be used in conjunction with human-controlled vehicles, e.g. in conjunction with adaptive cruise control or automatic emergency braking systems.

As may be seen, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
    a plurality of sensors configured to detect external features in the vicinity of the automotive vehicle;
    an actuator configured to control vehicle steering, acceleration, braking, or shifting; and
    at least one controller in electronic communication with respective sensors of the plurality of sensors and the actuator, the at least one controller being programmed with an automated driving system control algorithm and configured to automatically control the actuator based on the automated driving system control algorithm, the automated driving control system algorithm including:
        a first localization algorithm configured to receive first sensor readings from a first group of respective sensors of the plurality of sensors and provide a first vehicle pose based on the first sensor readings, the first vehicle pose including a first location and a first orientation of the vehicle,
        a second localization algorithm configured to receive second sensor readings from a second group of respective sensors of the plurality of sensors and provide a second vehicle pose based on the second sensor readings, the second vehicle pose including a second location and a second orientation of the vehicle, and
        a localization arbitration algorithm configured to, in response to the first vehicle pose being outside of a predetermined range of the second vehicle pose, generate a diagnostic signal.

2. The vehicle of claim 1, wherein the at least one controller is further programmed to, in response to the first vehicle pose being within the predetermined range of the second vehicle pose, determine a primary vehicle pose among the first vehicle pose and the second vehicle pose, and control the actuator according to the automated driving system control algorithm based on the primary pose.

3. The automotive vehicle of claim 1, wherein the diagnostic signal includes a parameter representative of a difference between the first vehicle pose and the second vehicle pose.

4. The automotive vehicle of claim 1, wherein the at least one controller is further programmed to, in response to the diagnostic signal, control the actuator according to a fall back command.

5. The automotive vehicle of claim 1, wherein the at least one controller includes a first controller and a second controller, the first controller being programmed with the first localization algorithm and the second controller being programmed with the second localization algorithm.

6. The vehicle of claim 1, wherein the first localization algorithm includes a visual-odometry-based pose estimation and the second localization algorithm includes a LiDAR-odometry-based pose estimation.

7. A method of controlling a vehicle, comprising:
    providing the vehicle with a plurality of sensors configured to detect external features in the vicinity of the vehicle;
    providing the vehicle with an actuator configured to control vehicle steering, throttle, braking, or shifting;
    providing the vehicle with at least one controller in electronic communication with respective sensors of the plurality of sensors and the actuator, the at least one controller being programmed with an automated driving control system algorithm;
    receiving, via the at least one controller, first sensor readings from a first group of respective sensors of the plurality of sensors;
    determining, via the at least one controller, a first vehicle pose based on the first sensor readings, the first vehicle pose including a first location and a first orientation of the vehicle;
    receiving, via the at least one controller, second sensor readings from a second group of respective sensors of the plurality of sensors;
    determining, via the at least one controller, a second vehicle pose based on the second sensor readings, the second vehicle pose including a second location and a second orientation of the vehicle; and
    in response to the first vehicle pose being outside of a predetermined range of the second vehicle pose, automatically generating a diagnostic signal.

8. The method of claim 7, further comprising, in response to the first vehicle pose being within the predetermined range of the second vehicle pose, determining, via the at least one controller, a primary vehicle pose among the first vehicle pose and the second vehicle pose, and controlling, via the at least one controller, the actuator according to the automated driving system control algorithm based on the primary pose.

9. The method of claim 7, wherein the diagnostic signal includes a parameter representative of a difference between the first vehicle pose and the second vehicle pose.

10. The method of claim 7, further comprising, in response to the diagnostic signal, automatically controlling the actuator according to a fall back command.

11. The method of claim 7, wherein providing the vehicle with at least one controller includes providing the vehicle with a first controller and a second controller, receiving first sensor readings is performed via the first controller, determining a first vehicle pose is performed via the first controller, receiving second sensor readings is performed via the second controller, and determining a second vehicle pose is performed via the second controller.

12. The method of claim 7, wherein determining a first vehicle pose includes performing a visual-odometry-based pose estimation, and determining a second vehicle pose includes performing a LiDAR-odometry-based pose estimation.

13. A control system for a vehicle including at least one controller programmed to:
receive first sensor readings from a first group of sensors;
provide a first vehicle pose based on the first sensor readings, the first vehicle pose including a first location and a first orientation of the vehicle;
receive second sensor readings from a second group of sensors;
provide a second vehicle pose based on the second sensor readings, the second vehicle pose including a second location and a second orientation of the vehicle; and
in response to the first vehicle pose being outside a predetermined range of the second vehicle pose, generate a diagnostic signal.

14. The control system of claim 13, wherein the at least one controller is further programmed to, in response to the first vehicle pose being within the predetermined range of the second vehicle pose, determine a primary vehicle pose among the first vehicle pose and the second vehicle pose, and control the actuator according to the automated driving system control algorithm based on the primary pose.

15. The control system of claim 13, wherein the diagnostic signal includes a parameter representative of a difference between the first vehicle pose and the second vehicle pose.

16. The control system of claim 13, wherein the at least one controller is further programmed to, in response to the diagnostic signal, control at least one actuator according to a fall back command.

* * * * *